(12) United States Patent
Lindoff et al.

(10) Patent No.: US 7,787,845 B2
(45) Date of Patent: Aug. 31, 2010

(54) UE MEASUREMENT SCHEDULING BASED ON MEASUREMENT BANDWIDTH

(75) Inventors: Bengt Lindoff, Bjärred (SE); Elias Jonsson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 528 days.

(21) Appl. No.: 11/856,233

(22) Filed: Sep. 17, 2007

(65) Prior Publication Data
US 2009/0075647 A1    Mar. 19, 2009

(51) Int. Cl.
*H04B 17/00* (2006.01)
(52) U.S. Cl. ........... 455/226.1; 455/226.2; 455/424; 375/340; 375/259; 375/224; 370/449
(58) Field of Classification Search ........... 455/226.2, 455/226.1, 424; 375/340, 259, 224; 370/449
See application file for complete search history.

(56) References Cited

U.S. PATENT DOCUMENTS

| 5,128,959 | A | 7/1992 | Bruckert | |
|---|---|---|---|---|
| 6,205,334 | B1 | 3/2001 | Dent | |
| 7,606,335 | B2 * | 10/2009 | Kloper et al. | 375/340 |
| 2003/0157934 | A1 | 8/2003 | Liant | |
| 2004/0110524 | A1 | 6/2004 | Takano et al. | |
| 2005/0013316 | A1 * | 1/2005 | Liao et al. | 370/449 |
| 2006/0205406 | A1 | 9/2006 | Pekonen et al. | |
| 2007/0093253 | A1 | 4/2007 | Lindoff et al. | |

FOREIGN PATENT DOCUMENTS

WO    2006/064391    6/2006

OTHER PUBLICATIONS

QUALCOMM EUROPE. "Time and Frequency Averaging for Mobility Measurements." R4-071033. 3GPP TSG-RAN WG4 #43-bis, Jun. 25-29, 2007, Orlando, Florida, US.
NOKIA, NOKIA SIEMENS NETWORKS. "RSSI Measurement Bandwidth." R4-071329. 3GPP TSG-RAN4 #44 Meeting, Aug. 20-24, 2007, Athens, Greece.
3GPP RAN WG1. "LS on LTE Measurement Supporting Mobility." 3GPP TSG-WG1 Meeting #48, Feb. 12-16, 2007, St. Louis, Missouri, US.
"Measurements bandwidth and filtering," 3GPP TSG-RAN WG1 #49bis, Orlando, FL, Jun. 25-29, 2007, pp. 1-7.

* cited by examiner

*Primary Examiner*—Sanh D Phu
(74) *Attorney, Agent, or Firm*—Coats & Bennett, P.L.L.C.

(57) ABSTRACT

The method and apparatus described herein uses variable length snapshot periods to determine signal strength measurements. A mobile station determines the measurement bandwidth associated with a base station, and sets the snapshot period based on the measurement bandwidth. The mobile station determines the signal strength of serving and neighboring cells during snapshot periods. Such signal strength measurements may be used to assist and/or direct handover operations.

16 Claims, 4 Drawing Sheets

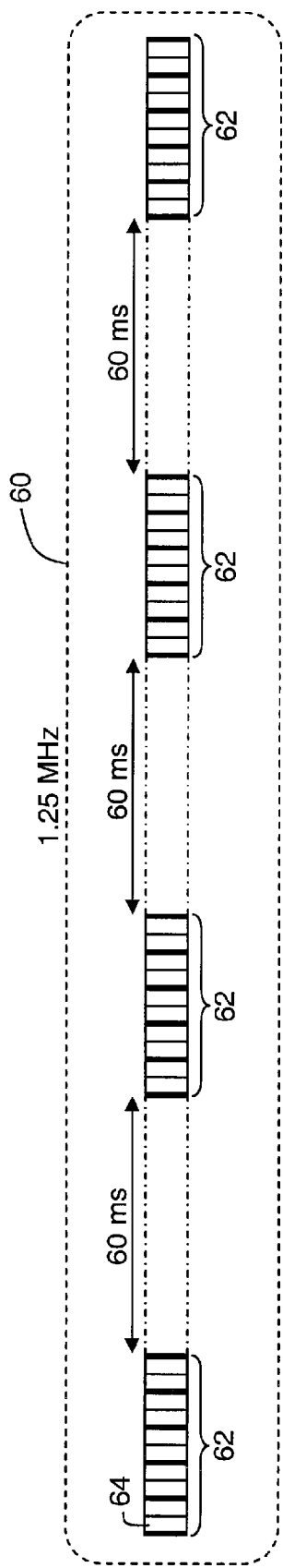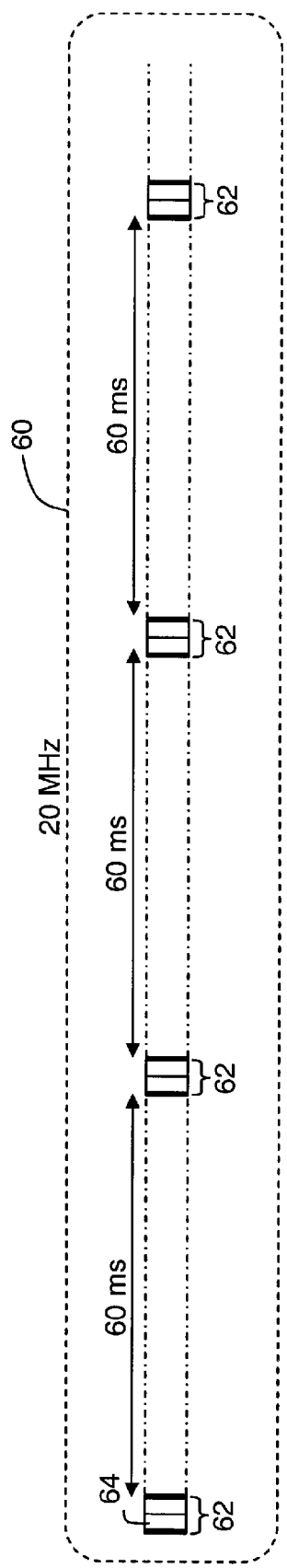
FIG. 3A
FIG. 3B

UE MEASUREMENT SCHEDULING BASED ON MEASUREMENT BANDWIDTH

BACKGROUND

The present invention relates generally to making signal strength measurements, and more particularly to making signal strength measurements during variable snapshot periods.

Handover operations in a wireless network often rely on signal strength measurements collected by the mobile stations in the network. For example, mobile stations may measure the strength of signals received from base stations in a serving cell and one or more neighbor cells. A mobile station may assist with handover operations by reporting the measured signal strengths to the network. Alternatively, a mobile station may direct handover operations by requesting handover based on the measured signal strengths.

In conventional networks, the mobile station typically samples and measures the strength of the received signal for a fixed period, referred to herein as the snapshot period. The conventional practice may lead to problems. For example, the Long Term Evolution (LTE) of the Third Generation Partnership Project (3GPP), which may use Orthogonal Frequency Division Multiplexing (OFDM) to implement wireless communications between mobile stations and a wireless network, is expected to allow flexible signal bandwidths from 1.25 MHz to 20 MHz by allocating a variable number of subcarriers. Proposed signal bandwidths currently include 1.25, 1.6, 2.5, 5, 10, 15, and 20 MHz. When the snapshot period is fixed, the number of samples or measurements depends on the signal bandwidth and the length of the snapshot period. For narrow signal bandwidths, the snapshot periods should be long enough to allow a sufficient number of samples to be taken to obtain a reliable estimate of the signal strength. Because the number of samples increases with signal bandwidth, the processing speed or processing capacity needs to be high enough to process measurements for wide signal bandwidths. In some cases, this causes the mobile station to process an unnecessarily large amount of data, and therefore, to expend an unnecessarily large amount of current.

SUMMARY

The present invention provides a method and apparatus for making signal strength measurements in a system that allows base stations to operate with different signal bandwidths. In one exemplary embodiment, a wireless receiver varies a snapshot period used to make signal strength measurements based on the corresponding base station's signal bandwidth. In one embodiment, a wireless receiver includes a measurement unit. The measurement unit determines a measurement bandwidth and varies a snapshot period for making signal strength measurements based on the measurement bandwidth. The measurement unit determines the strength of the received signal in the snapshot period.

BRIEF DESCRIPTION OF THE DRAWINGS

FIGS. 3A and 3B show exemplary snap shot periods within a measurement period for different measurement bandwidths.

DETAILED DESCRIPTION

The method and apparatus of the present invention makes signal strength measurements in a mobile communication network that allows different base stations to operate with different signal bandwidths. Such signal strength measurements may be used to assist and/or direct handover operations. To facilitate the description of various embodiments, the following first provides a general description of an exemplary mobile communication network.

Figure 1:
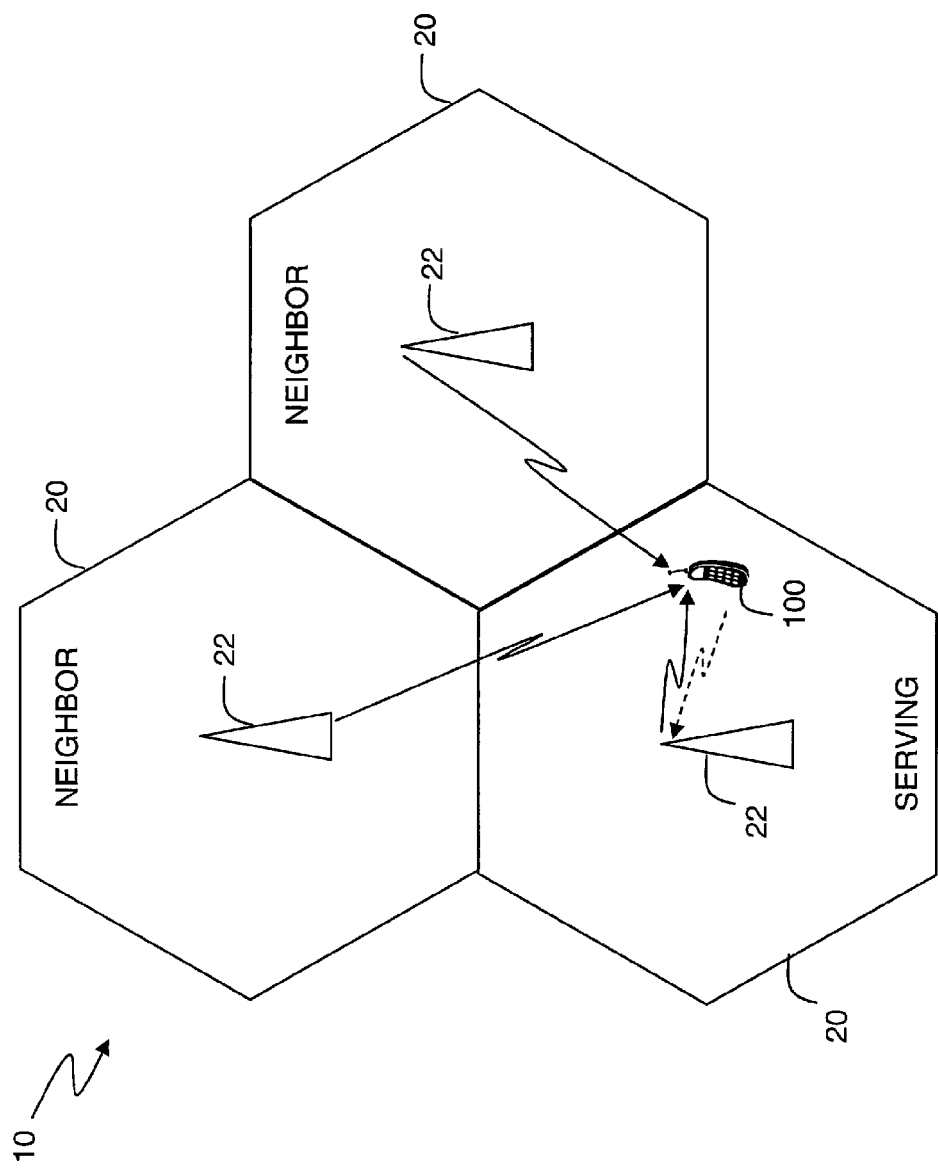
FIG. 1 shows one exemplary wireless network.

FIG. 1 illustrates an exemplary mobile communication network indicated generally by the numeral 10. Mobile communication network 10 may use Orthogonal Frequency Division Multiplexing (OFDM) as the transmission method for downlink transmissions. The geographic area of the mobile communication network 10 is divided into cells 20. The cells 20 may be further divided into sectors. At least one base station 22 is located in each cell 20 for communicating with a mobile station 100 in the cell 20. If the cell 20 is divided into sectors, the cell 20 may include one base station 22 for all sectors, or separate base stations 22 for each sector in the cell 20. To simplify the explanation of the present invention, it is assumed that each cell 20 comprises a single sector with a single base station 22. The principles described may be easily extended to multi-sector cells 20.

Transmissions on the downlink from the base station 22 are indicated with solid lines, while uplink transmissions from the mobile station 100 are indicated with dashed lines. The mobile station 100 exchanges data and control signals with the base station 22 in the serving cell 20 using uplink and downlink transmissions. The mobile stations 100 may also detect downlink transmissions from the base stations 22 in nearby cells 20. The serving cell 20 may provide the mobile station 100 with a neighbor list of the nearby cells 20. Alternatively or additionally, the mobile station 100 may detect one or more nearby cells 20. As the mobile station 100 moves away from the serving cell 20 toward a neighbor cell 20, the signal strength from the serving cell 20 will diminish while the signal strength from the neighbor cell 20 will increase.

The mobile station 100 and/or a controlling entity in the network make handover decisions based on the strength of the serving and neighbor base station signals at the mobile station 100. To that end, the mobile station 100 measures the signal strength of downlink transmissions from the serving and neighbor base stations 22. For mobile-assisted handover, the mobile station 100 sends the measured signal strengths to the serving base station 22, where the network 10 uses the received signal strength measurements to make handover decisions. For mobile-directed handover, the mobile station 100 evaluates the signal strength measurements and requests the network 10 to handover the mobile station 100 to a specific neighbor cell 20 based on the evaluation. For example, when the signal strength from a neighbor base station 22 exceeds the signal strength from the serving base station 22 by a predetermined amount, the mobile station 100 may direct the network 10 to handover control to the higher power neighbor cell 20. After handover, the base station 22 in the newly selected cell 20 begins transmitting data and control signals to the mobile station 100.

The signal strength measurements used for handover decisions should reflect some average signal strength to reduce fast fading effects. Typically, the mobile station 100 achieves this by determining the strength of a signal in equally spaced snapshot periods of a measurement period. One exemplary measurement period is 200 ms long and contains three to four snapshot periods. Each snapshot period has a predetermined length generally ranging between 0.5 ms and 5 ms. Such a measurement period adequately filters out Doppler rates above 5-10 Hz, which corresponds to 3-6 km/hr at 2 GHz. In an OFDM system, such snapshot periods typically include 2-20 OFDM symbols, including reference symbols that may be used to determine a Received Signal Reference symbol Power (RSRP) for a base station 22.

The mobile station 100 typically includes one Fast Fourier Transform (FFT) resource operating in an over sampling fashion with respect to the OFDM symbol sampling rate. This resource is shared to process data received from the serving base station 22 and to measure the signal strength of signals from the serving and neighbor base stations 22. The processing time for an FFT of size N is proportional to the FFT clock rate. Thus, processing a slot within a signal having a 20 MHz bandwidth typically takes 16 times longer than processing a slot within a signal having a 1.25 MHz bandwidth. When a mobile station relies on fixed snapshot periods to determine signal strength measurements for different base stations 22 having different measurement bandwidths, such as base stations 22 in an LTE network, the widest snapshot period must be selected to obtain the desired measurement accuracy for all possible measurement bandwidths. As a result, conventional mobile stations must allocate the FFT resources required for a 1.25 MHz bandwidth to each signal strength measurement operation, even when the actual measurement bandwidth differs from 1.25 MHz. This may cause various processing and/or power consumption inefficiencies.

Figure 2:
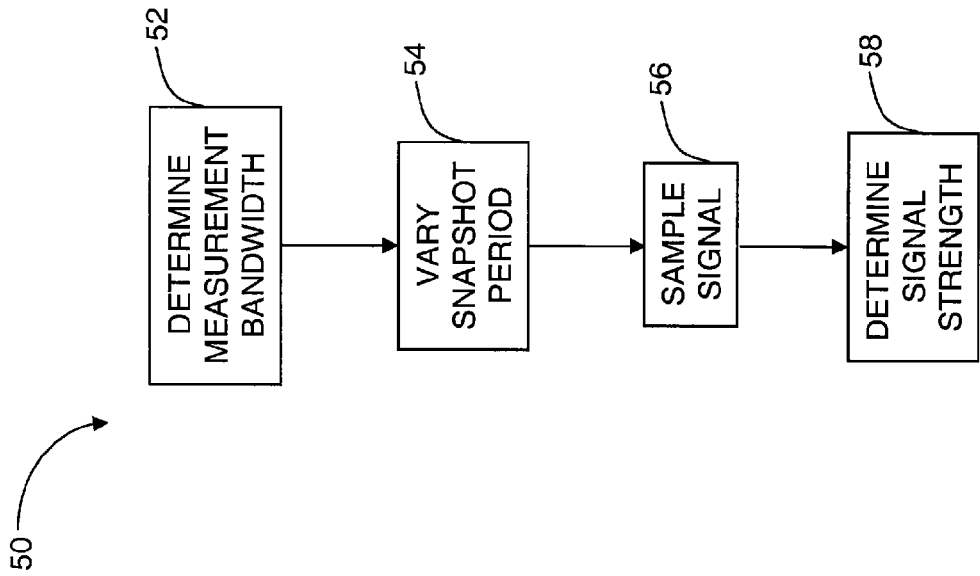
FIG. 2 shows a flow chart for an exemplary method according to one embodiment of the present invention.

The present invention addresses this problem by varying the snapshot period based on the measurement bandwidth. FIG. 2 shows one exemplary process 50 for making signal strength measurements using variable snapshot periods. Mobile station 100 determines the measurement bandwidth for a base station 22 (block 52). The mobile station 100 may process a signal received from the base station 22 to determine the measurement bandwidth. Alternatively, the mobile station 100 may determine the measurement bandwidth based on a bandwidth indicator received from the base station 22. Based on the measurement bandwidth, mobile station 100 selects a snapshot period (block 54). For example, the mobile station 100 may use a look-up table that cross-references possible measurement bandwidths with desired snapshot periods. Subsequently, the mobile station 100 samples the signal in the snapshot period (block 56) and determines the strength of a signal received from the base station 22 by processing the samples from the selected snapshot periods within the measurement period (block 58). The mobile station 100 repeats this process for each cell 20 in its neighbor list.

Mobile station 100 may determine the strength of the signal in a measurement period using any known technique. In one embodiment, the mobile station 100 determines the strength of a signal in two or more snapshot periods within the measurement period. An exemplary measurement period has 3-4 snapshot periods. For example, the mobile station 100 may determine the strength of the signal by averaging the signal in a plurality of snapshot periods.

FIGS. 3A and 3B show exemplary measurement periods 60 having different snapshot periods 62 for 1.25 MHz and 20 MHz measurement bandwidths, respectively. In the illustrated examples, each measurement period 60 contains four snapshot periods 62 spaced by 60 ms. As shown in FIG. 3A, the snapshot period 62 for the 1.25 MHz measurement bandwidth may be set to 5 ms, (10 slots 64). Contrastingly, the snapshot period 62 for the 20 MHz measurement bandwidth may be set to 1 ms (2 slots 64), as shown in FIG. 3B. In theory, the snapshot period 62 for the 20 MHz measurement bandwidth may be even shorter. However, other factors, such as channel delay spread, measurement definition, etc., practically limit the snapshot period 62 to at least 0.5 ms in LTE. Mobile station 100 measures the strength of the signal in the snapshot period 62, as discussed above. By making the snapshot periods 62 within each measurement period 60 specific to the measurement bandwidth of the corresponding base station 22, the mobile station 100 tailors the processing time and resources required to determine a signal strength for a specific base station 22 to the base station's measurement bandwidth. This frees up processing resources and more efficiently utilizes power in the mobile station 100.

Figure 4:
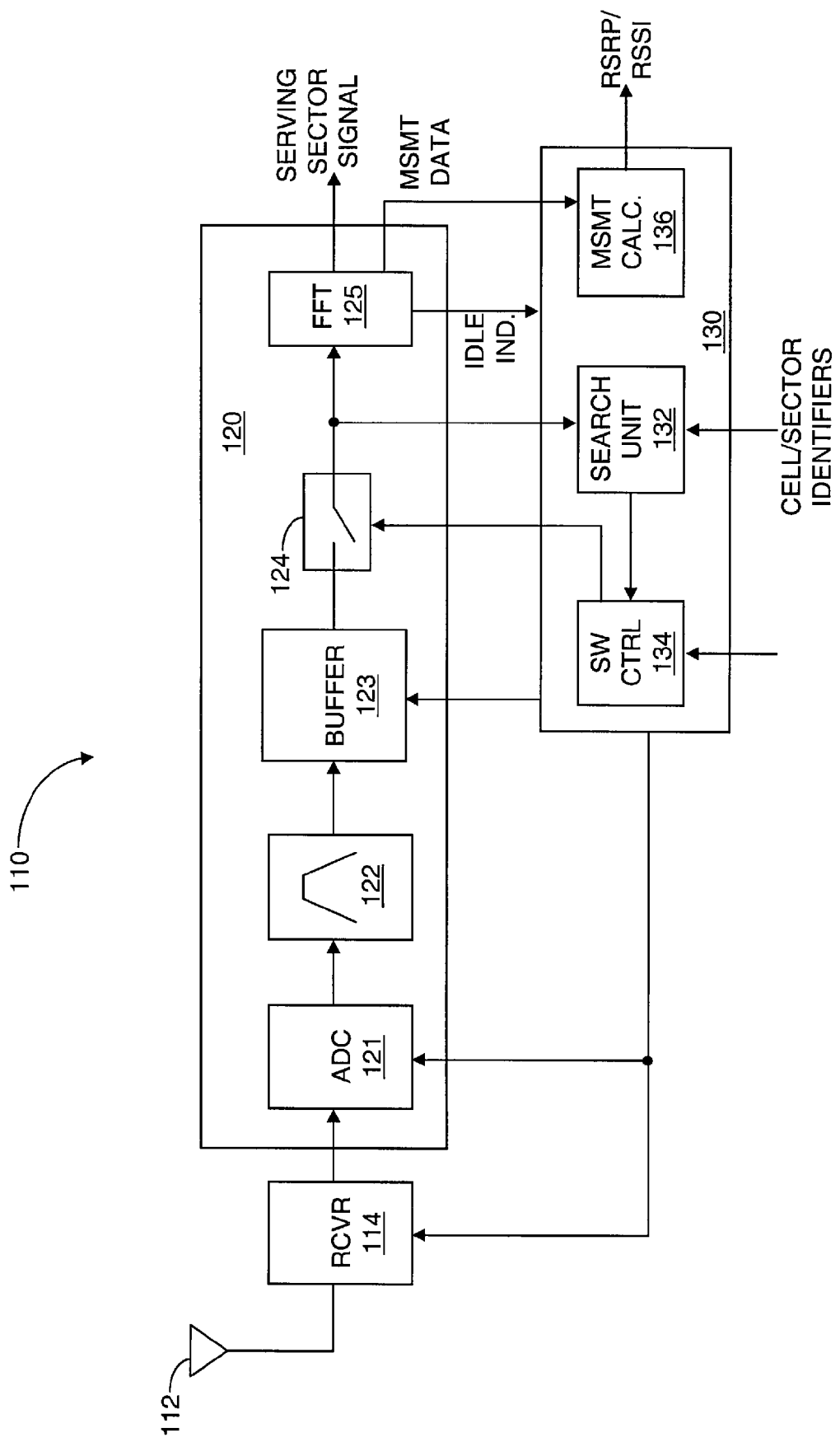
FIG. 4 shows a block diagram of an exemplary receiver according to one embodiment of the present invention.

FIG. 4 shows one exemplary receiver 110 for implementing the above-described signal measurement process 50. Receiver 110 may be disposed in any mobile station 100. The receiver 110 comprises an antenna 112, a receiver front-end 114, a processing unit 120, and measurement unit 130. It will be appreciated that the present invention is not limited to the specific arrangement of elements shown in FIG. 4. The processing unit 120 and/or the measurement unit 130 may comprise one or more microprocessors, microcontrollers, and/or a combination thereof.

The receiver front-end 114 down-converts a signal received via antenna 112 to a baseband signal. Processing unit 120 includes an Analog-to-Digital Converter (ADC) 121, filter 122, buffer 123, switch 124, and FFT unit 125. ADC 121 converts the input analog signal to a digital signal, and filter 122 filters the digital signal to the desired signal bandwidth. Buffer 123 stores the filtered signal. Data signals, such as OFDM symbols, from the base station 22 in the serving cell 20 are fed forward to the FFT unit 125 and processed according to any known technique.

Measurement unit 130 determines the snapshot period 62 for the serving and neighbor base stations 22. During a period of time corresponding to the snapshot period 62, when the FFT unit 125 is idle, the measurement unit 130 closes switch 124 to provide the signal from the buffer 123 to the FFT unit 125. The measurement unit 130 uses the measurement data output by FFT unit 125 to determine the signal strength measurements for a base station 22. In one embodiment, measurement unit 130 includes a search unit 132, a switch controller 134, and a measurement calculator 136. Search unit 132 identifies the measurement bandwidth for a base station 22, e.g., by evaluating the received signal or interpreting a received bandwidth identifier. Based on the identified measurement bandwidth, the search unit 132 determines the appropriate snapshot period 62 for the base station 22. When FFT unit 125 indicates it is idle, the signal stored in switch controller 134 controls switch 124 to provide the signal stored in buffer 123 to the FFT unit 125 during the determined snapshot periods of the measurement period. FFT unit 125 processes the signal in the snapshot periods and provides measurement data to the measurement unit 130. Measurement calculator 136 processes the measurement data provided by FFT unit 125 to determine the signal strength measurement for the cell 20. The calculated signal strength measurement may be in the form of a Received Signal Reference symbol Power (RSRP), Received Signal Strength Indicator (RSSI), or any combination thereof. It will be appreciated that measurement unit 130 controls switch 124 in this manner for each of the serving base station 22 and one or more neighbor base stations 22. For mobile-directed handover, a controller (not shown) in the mobile station 100 makes handover decisions based on the signal strength measurements output by measurement unit 130. For mobile-assisted handover, the mobile station 100 sends the signal strength measurements output by the measurement unit 130 to the serving base station 22.

The above described method and apparatus tailors the snapshot periods used to obtain signal strength measurements for a particular base station to the measurement bandwidth of the base station. This enables the mobile station 100 to efficiently allocate resources, e.g., power and FFT processing resources. Further, while the FFT unit 125 processes buffered signals as described above, measurement unit 130 may deactivate the receiver 114 and/or ADC 121 to further conserve power resources.

The above describes the invention in terms of an LTE network that uses OFDM signaling. However, it will be appreciated that the present invention applies to any variable signal bandwidth network that requires the mobile station to measure the strength of signals received at the mobile station from the serving base station and one or more neighbor base stations.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for measuring the strength of received signals comprising:
   determining a measurement bandwidth;
   varying a snapshot period for determining signal strength measurements based on the measurement bandwidth by:
      reducing the snapshot period with increasing measurement bandwidth; and
      increasing the snapshot period with decreasing measurement bandwidth; and
   determining signal strength measurements of a received signal in the snapshot period.

2. The method of claim 1 wherein determining the measurement bandwidth comprises:
   receiving a bandwidth indicator from a network device; and
   determining the measurement bandwidth based on the received bandwidth indicator.

3. The method of claim 1 wherein determining the measurement bandwidth comprises processing the received signal to determine the measurement bandwidth.

4. The method of claim 1 wherein determining signal strength measurements comprises determining the signal strength measurements of the received signal in two or more snapshot periods within a measurement period.

5. The method of claim 4 further comprising determining an average signal strength based on the signal strength measurements determined during the measurement period.

6. The method of claim 5 wherein the average signal strength is associated with a base station in a serving sector or cell.

7. The method of claim 5 wherein the average signal strength is associated with a base station in a neighbor sector or cell.

8. The method of claim 1 wherein the received signal comprises an OFDM signal.

9. A wireless receiver comprising:
   a receiver to receive a wireless signal; and
   a measurement unit configured to:
      determine a measurement bandwidth;
      vary a snapshot period for determining signal strength measurements based on the measurement bandwidth by:
         reducing the snapshot period with increasing measurement bandwidth; and
         increasing the snapshot period with decreasing measurement bandwidth; and
      determining signal strength measurements of the received signal in the snapshot period.

10. The wireless receiver of claim 9 wherein the measurement unit determines the measurement bandwidth by:
    receiving a bandwidth indicator from a network device; and
    determining the measurement bandwidth based on the received bandwidth indicator.

11. The wireless receiver of claim 9 wherein the wireless signal includes information regarding the measurement bandwidth, and wherein the measurement unit processes the wireless signal to determine the measurement bandwidth.

12. The wireless receiver of claim 9 wherein the measurement unit determines the signal strength measurements by processing the received signal in two or more snapshot periods within a measurement period.

13. The wireless receiver of claim 12 wherein the measurement unit is further configured to determine an average signal strength based on the signal strength measurements determined during the measurement period.

14. The wireless receiver of claim 13 wherein the average signal strength is associated with a serving cell.

15. The wireless receiver of claim 13 wherein the average signal strength is associated with a neighboring cell.

16. The wireless receiver of claim 9 wherein the received signal comprises an OFDM signal.

\* \* \* \* \*